March 7, 1950 G. A. LYON 2,499,399
APPARATUS AND METHOD FOR PRESSING AND CONVEYING
EXTRUDED PLASTIC CHARGES
Filed Dec. 28, 1945 2 Sheets-Sheet 1
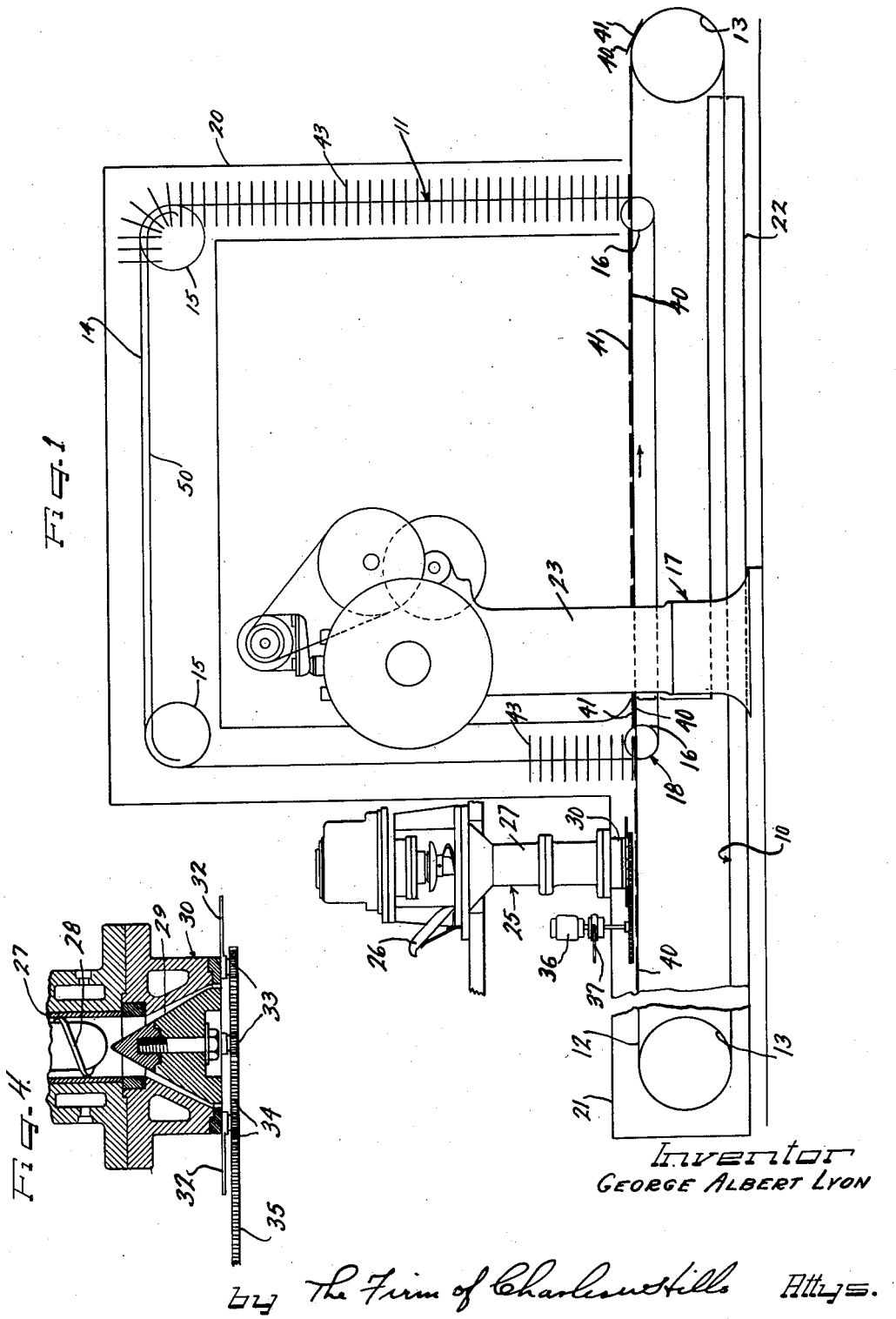
Inventor
GEORGE ALBERT LYON
by The Firm of Charles W. Hills Attys.

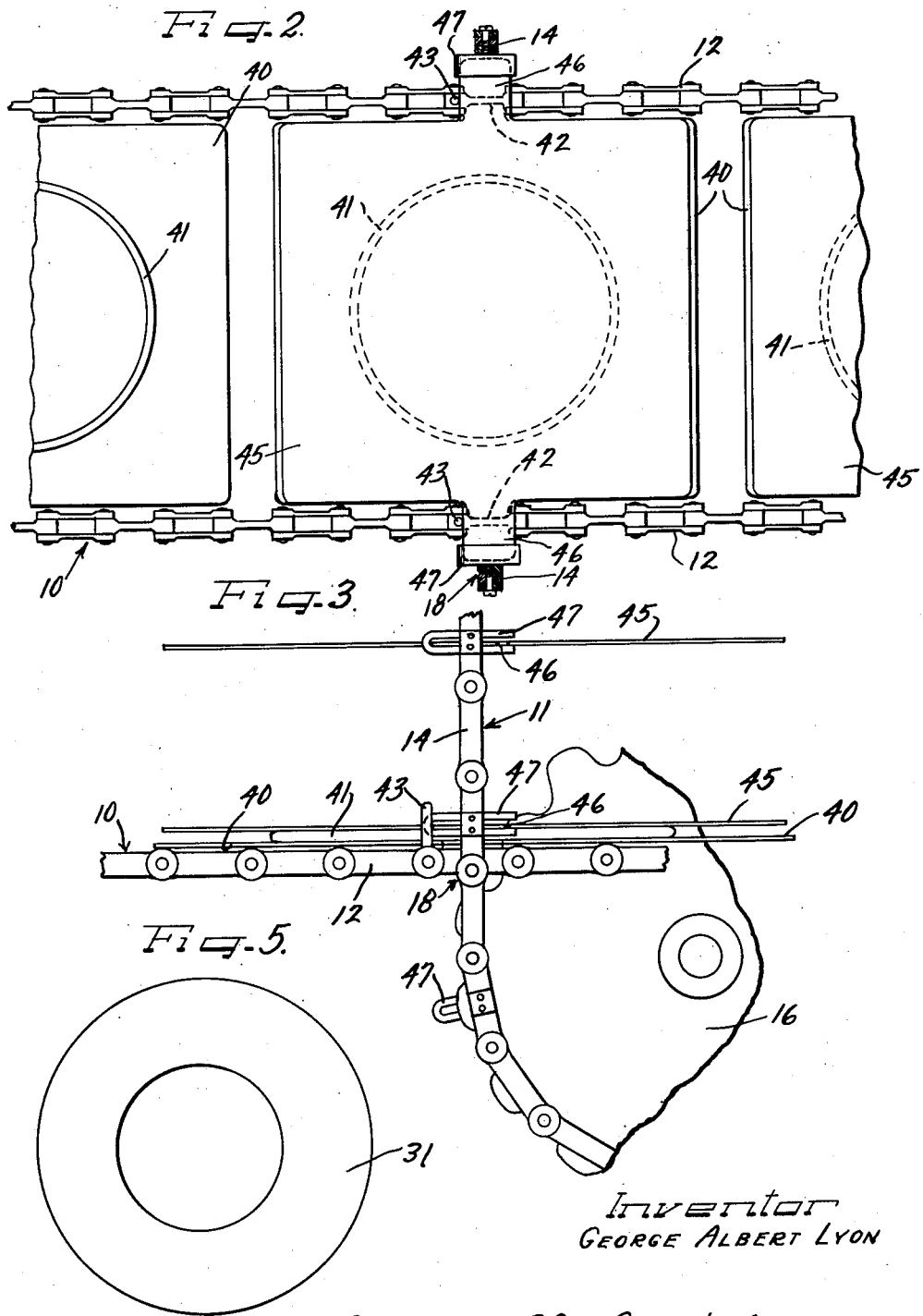

Patented Mar. 7, 1950

2,499,399

UNITED STATES PATENT OFFICE 2,499,399

APPARATUS AND METHOD FOR PRESSING AND CONVEYING EXTRUDED PLASTIC CHARGES

George Albert Lyon, Allenhurst, N. J.

Application December 28, 1945, Serial No. 637,669

8 Claims. (Cl. 18—4)

This invention relates to a method of and apparatus for forming sheet-like articles, and more particularly to a method of and apparatus for forming plastic.

An object of this invention is to provide an improved method of and apparatus for forming material, such as plastic, which will enable the forming directly from plastic mix of flat plastic articles.

Another object of this invention is to provide a method of forming from plastic mix articles in flat form, such as flat rings, which have highly polished flat surfaces.

Still another object of this invention is to provide a novel but simple apparatus comprising intersecting conveyors, one of which will deliver pieces of plastic material and the other of which will deliver plates in predetermined sequence for use in the flattening of the pieces of material.

Yet another object of this invention is to provide a method of and apparatus for forming in a continuous manner plastic articles and which may be used for a large scale production on an economical basis of automobile plastic parts, such, for example, as plastic trim rings for automobile wheels.

In accordance with the general features of this invention, there is provided in a method of forming plastic the steps of progressively feeding pieces of material toward a work performing station, delivering at right angles to the material being fed a series of stacked plates, depositing on each piece of material a plate, and thereafter at the station pressing the plate against the material to flatten the same.

Another feature of the invention relates to the provision in the aforesaid method of additional steps of severing and delivering the material to the feeding area, and of properly heating the material and plates in advance of the work performing station.

Still another feature of the invention relates to the provision of a material fabricating apparatus including conveyors at an angle to each other and intersecting each other adjacent a work performing station, a heating chamber embracing portions of said conveyors, one of the conveyors feeding pieces of material through said chamber and the other being timed with the feeding to deliver progressively metal plates to and over the pieces of material being fed; there being provided at the work performing station a press for engaging the plate on a piece of material to flatten the material under the plate into an article of predetermined configuration.

A still further feature of the invention relates to the provision of abutments on the aforesaid feed conveyor for progressively engaging the plates on the other conveyor to dislodge them from that conveyor for use during the pressing operation, said other conveyor having clips which detachably hold the plates in stacked relation and from which the plates can be progressively ejected; such clips also being arranged to progressively engage and pick up the plates after the pressing operation.

Other objects and features of this invention will more fully appear from the following detailed description taken in connection with the accompanying drawings which illustrate a single embodiment thereof and in which:

Figure 1 is a more or less diagrammatic view of an apparatus embodying the features of this invention and adapted to practice my novel method;

Figure 2 is a fragmentary plan view of a portion of a horizontal conveyor showing how the sprocket chains on that conveyor carry spaced metal plates on which pieces of plastic material are delivered.

Figure 3 is a fragmentary side view of portions of the vertical and horizontal conveyors at their area of intersection and showing how the abutments on the horizontal conveyor are adapted to engage the ears of the plates on the vertical conveyor for progressively ejecting the plates in sequential order over the pieces of plastic on the horizontal conveyor in advance of the work performing station;

Figure 4 is an enlarged fragmentary cross sectional view through the nozzle of the extruder and showing the knives for cutting off pieces of material from the extruded tubular stock; and Figure 5 is a plan view of the flattened plastic article or ring made in accordance with the features of this invention.

As shown on the drawing:

Referring now to Figure 1, the reference character 10 designates generally a horizontal or feed conveyor, and the reference character 11 designates generally a vertical or plate feeding conveyor. These conveyors as will become more clear from the description of Figures 2 and 3 are of the sprocket and chain type. That is to say, the conveyor 10 includes parallel sprocket chains 12 trained over sprocket wheels 13, one or both of which may be driven. Similarly, the conveyor 11 includes sprocket chains 14 trained over a series of sprocket wheels 15—15 and 16—16, at least one of which is likewise driven in predetermined time relation to the forward movement of the conveyor 10. Any suitable driving means may be employed for these conveyors and for timing their movement so that they advance in the desired relationship to each other.

The links of the chains, as well as the sprockets of these conveyors may be of any suitable or conventional construction, such as is well known in the sprocket chain conveyor art.

The two conveyors 10 and 11 are adapted to intersect each other adjacent a work performing or press station 17. The spaced chains 14 of the conveyor 11 are preferably spaced a greater distance than the parallel chains 12 of the conveyor 10 so that they extend along the sides of the conveyor 10, as indicated generally at 18 (Figures 2 and 3).

The conveyor 10 is of the elongated type, embracing upper and lower legs whereas the conveyor 11 is of the rectangular type. The top and side legs of the conveyor 11 are embraced by a heating chamber 20, which heating chamber has formed integral with it, a lateral section 21 for embracing and enveloping the forward end of the conveyor 10 in advance of the work performing station 17. In this respect it should be noted that the direction of feed of the material on top of the conveyor 10 is from the left to the right, as shown in Figure 1. The heating chamber also may have an extension 22 for embracing the lower leg of the conveyor 10 as shown in Figure 1. In this way the material on the conveyor 10 is heated before it reaches the work performing station, but after leaving that station it is exposed for cooling between the station 17 and the right hand sprockets 13, shown in Figure 1. Any suitable cooling means may be employed, such as the air itself or water sprays (not shown).

Located at the work performing station 17 is a conventional press 23 which may include the usual upper and lower platens between which work can be pressed for flattening. The stroke of this press is preferably timed with the forward movement of the material on the conveyor 10 so that the press can continuously operate to flatten pieces of material without any interruption in the continuous operation of the two conveyors 10 and 11.

It should be noted both conveyors pass through the press or between the uprights of the same with the material in position to be pressed against the lower platen of the press.

Located to the left of and in advance of the intersection of the two conveyors is a vertical plastic extruder, designated generally by the reference character 25. This extruder may be of the construction shown in my copending application, Serial No. 636,874, filed December 22, 1945, although any other suitable type of plastic extruding mechanism may be employed.

The extruder 25 includes a hopper 26 which is adapted to receive batches of plastic mix for delivery into a screw-type extruding tube 27 of the extruder. This tube 27 has disposed in it a member having a spiral fin 28 for progressively forcing the plastic out of an annular conical-like opening 29 in the discharge nozzle 30 of the extruder. It should be noted that the extruder, as is customary, is jacketed so as to be heated inasmuch as the plastic must be maintained in a heated condition in order to be flowable.

The plastic material used may be of any desirable type although excellent results may be obtained by using ethyl cellulose, cellulose acetate or vinyl resins.

The construction of the extruder does not per se constitute part of this invention as that structure is being claimed in my copending application. The plastic discharged from the extruder is in tubular form and of a diameter predetermined to meet the requirements of the particular shape of plastic ring desired. While I have shown my novel method and apparatus as being especially adapted for the forming of plastic rings, such as the ring 31 shown in Figure 5, it is to be understood that the invention may be used with equal advantage for fabricating pieces of material in shapes other than of annular form.

As the tubular plastic is discharged from the extruder nozzle 30, ring-like pieces are cut therefrom by whirling knives 32. These knives may be of any suitable number and are arranged with their pivotal axes in a common circle below the nozzle 30. Each of these knives has a pinion gear 33 meshing with a common internal gear 34 driven by any suitable gear or gearing 35. Any suitable driving mechanism may be employed for operating the gear 35, such as the motor drive 36 shown in Figure 1, it being understood that the gearing that is employed may be of such type as to cause the knives 32 to rotate continuously but at such a rate as to progressively cut off rings of plastic from the plastic tube as it is being advanced out of the extruder.

The motor drive 36 may, if it is so desired, embrace a manually operable clutch 37 for hand controlling the rotation of the knives 32. In other words, if it is so desired the rotation of the knives may be interrupted after each cut by manually throwing the clutch 37. Whether this is done depends on how rapidly the stock is being fed through the plastic extruder in comparison to the forward feeding of the material by the conveyor 10. If the knives 32 are rotated too fast in comparison with the feeding, then it may be desirable to periodically interrupt their rotation after each cut.

It should be noted that the nozzle 30 of the extruder is preferably located inside of the heating chamber extension 21 so that the plastic discharged from the extruder will not cool in advance of its delivery to the work performing station 17.

As each piece of plastic is cut from the tube, it falls through the center of the internal gear 34 onto a metal plate at 40 comprising a part of the horizontal feed conveyor 10. I have shown such a piece or ring of plastic by dotted lines in Figure 2, and have designated it generally by the reference character 41.

Now referring particularly to Figures 2 and 3, it will be perceived that the parallel sprocket chains 12 of the conveyor 11 support and carry a series of flat metal plates 40, which are all identical in construction. These plates are made of highly polished sheet metal and I find that excellent results may be obtained by making them of stainless steel.

Each of the plates 40 has diametrically opposite ears 42 (Figure 2) which are secured to the opposite longitudinal chains 12. Also secured to the chains adjacent the ears 42 are aligned, but opposite, vertical abutments 43, adapted to engage portions of a plate 45 carried by the vertical conveyor 11. This vertical conveyor, as is shown in Figure 1, has a series of these stainless steel plates 45, which are similar to the plates 40, but, as shown in Figure 2, may be slightly smaller in length.

Each of these plates 45 has diametrically opposite ears 46—46 which are detachably received in opposite U-shaped clips 47—47 carried by the sprocket chains 14—14 of the vertical conveyor 11. As best shown in Figure 3, the plates 45, as they are carried downwardly by the left leg of the conveyor 11, are brought into alignment with the forwardly advancing plate 40 on the horizontal conveyor 10 with a plastic ring 41 between the plates. The continued forward movement of the conveyor 10 results in the vertical abutments 43 engaging the edges of the opposite ears 46 on the adjoining plates 45, which in turn causes these abutments 43 to push the ears of the plate 45 out of the U-shaped clips 47. This causes the plate 45 to then be detached from the conveyor 11 and to be supported directly on the top of the plastic ring 41, carried by the aligned bottom plate 40.

It will, of course, be understood that this bringing into engagement of a lower plate 40, with a plastic ring 41 thereon, and an upper plate 45 occurs inside of the heating chamber extension 21, as shown in Figure 1.

Thereafter continued forward movement of the conveyor 10 advances the registered plates toward the right end of the heating chamber section 21 into the press 23. When in this position the timed upper platen of the press comes down giving the plates a strike and causing the plastic ring 41 therebetween to be flattened into sheet-like form.

During this entire operation both conveyors are continuing their movement so that the flattened plastic ring between the plates is advanced toward the right hand sprockets 13 in Figure 1, during which advancement the plastic is allowed to cool. This cooling may be supplemented by water sprays or the like as noted before. At the same time the lower leg of the conveyor 11, which still carries the clips 47, is advanced toward the right hand sprockets 16 of the conveyor 11 around which this leg of the conveyor moves upwardly so that the clips 47 are then reversed in position. That is to say, the U-shaped clips have their open ends facing the press 30 so that they are in a position to again receive the ears 46 of the advancing plates 45. This results in the plate 45 thus engaged by the clips being lifted off the flattened plastic whereby the plate, along with the others, can travel in stack-like form upwardly in the heating chamber 20.

The uppermost leg of heating chamber 20 may be provided with a longitudinal bar 50 cooperable with clips 47 to prevent the plate ears 46 from dropping out of the clips when the clips are in vertical positions on the upper leg of conveyor 11.

After passing the right hand leg of the heating chamber 20 (Figure 1) the lower plates 40 with flattened plastic rings thereon are caused to travel around the right hand sprocket wheels 13, in which position the plastic rings can be progressively stripped from the plates 40. These flattened rings are then each placed in a trimming press and cut into a true annulus so as to form the ring 31 (Figure 5). This ring may be given any transverse cross-sectional curvature that is desired in subsequent pressing operations.

It is, of course, clear that the plates 40 and 45 may be lubricated, if it is so desired, with any conventional lubricant that is used in connection with plastics. There are a number of lubricating fluids now on the market that are useful for this purpose.

While I have described the operation in connection with one set of plates 40 and 45, it is, of course, clear that the operation is the same in the case of the successive sets. In fact, conveyors 10 and 11 may be equipped with any number of desired plates consistent with compactness and efficient operation.

Subsequent to the stripping of the flattened plastic rings from the plates 40, the plates are carried back toward the press 23 on the underside of the conveyor 10 through the heating chamber section 22 and back into the heating chamber 21 ready for reuse.

I claim as my invention:

1. In a material fabricating apparatus, a feed conveyor for conveying material to be acted upon through a working zone, a series of individual material engaging members constructed and arranged to cooperate with said feed conveyor, and a continuous conveyor for supplying said members to and removing said members from the feed conveyor, said continuous conveyor comprising a delivery run adjacent the trailing end of the feed conveyor and a member-removing run adjacent the advance end of the feed conveyor, said delivery and member-removing runs being connected by an idling run, said continuous conveyor having a series of member engaging elements thereon arranged to support said members in the delivery and removal runs, the conveyors being synchronized in operation for delivery of said members by the delivery run of the continuous conveyor in predetermined sequence to the feed conveyor, and after the members have traveled on the feed conveyor independently of the continuous conveyor removal of said members, by said elements in the removal run.

2. In a material fabricating apparatus, a feed conveyor for conveying material to be acted upon through a working zone, a series of individual material engaging members constructed and arranged to cooperate with said feed conveyor, and a continuous conveyor for supplying said members to and removing said members from the feed conveyor, said continuous conveyor comprising a delivery run adjacent the trailing end of the feed conveyor and a member-removing run adjacent the advance end of the feed conveyor, said delivery and member-removing runs being connected by an idling run, said continuous conveyor having a series of member engaging elements thereon arranged to support said members in the delivery and removal runs, the conveyors being synchronized in operation for delivery of said members by the delivery run of the continuous conveyor in predetermined sequence to the feed conveyor and after the members have traveled on the feed conveyor independently of the continuous conveyor removal of said members by said elements in the removal run, said elements comprising clip structures opening in the direction of travel of the feed conveyor in the delivery run and opening in opposition to the direction of travel of the feed conveyor in the removal run.

3. In a material fabricating apparatus, a feed conveyor, a series of individual material engaging members, and a conveyor for delivering and removing said members with respect to said feed conveyor, said delivering and removing conveyor including generally U-shaped clips each opening in the direction of feed of the feed conveyor during delivery of said members and opening in opposition to the direction of travel of the feed conveyor during removal of said members, said members having means thereon engageable in said U-shaped clips and whereby the members are carried by the delivery and removal conveyor in the interim between delivery to the feed conveyor and removal therefrom.

4. In apparatus for fabricating flat sheet-like articles from thermoplastic material, conveyors disposed at an intersecting angle to pass each other behind a pressing station, one of said conveyors having means for feeding pieces of plastic forward through and beyond said pressing station in predetermined sequential manner, a series of individual plastic flattening plates, the remaining of said conveyors being timed in its passage past said one conveyor to deliver said plates successively to and over the advancing pieces of plastic, and a heating chamber enclosing the intersecting portions of said conveyors but leaving a substantial section of the one conveyor exposed beyond said pressing station for cooling of the pressed pieces.

5. In apparatus for forming thin sheet-like articles from thermoplastic material, a generally horizontal first conveyor for supporting a succession of thermoplastic pieces to be pressed to flat form, a second conveyor intersectingly related to pass the first conveyor while travelling downwardly and carrying a plurality of flat plates separably for deposit on the plastic pieces in succession and then again to pass the first conveyor while travelling upwardly to remove the plates after a predetermined distance of travel on said first conveyor, means for depositing plastic pieces onto the first conveyor before the same intersects the second conveyor, means for pressing said plates and the first conveyor together at a point beyond the intersection of the conveyors, and a heating chamber including portions in preheating relation to the first conveyor and in preheating relation to the second conveyor and encompassing the place where the conveyors intersect, but leaving the first conveyor free and exposed for cooling of the pressed plastic in the reach thereof extending between the pressing means and the point at which the plates are separated from the first conveyor by the second conveyor.

6. In combination in apparatus for forming flat ring-shaped sheets of thermoplastic material on the order of a cellulosic or vinyl resin plastic, a feeding conveyor including a series of generally square, flat supporting plates and arranged to advance the plates successively, an extruder arranged to deposit rod-like ring-shaped plastic pieces upon said plates in succession, a conveyor intersecting said feeding conveyor to pass by the latter beyond said extruder and carrying a series of detachable flat plates which are successively deposited upon the carrying plates superimposed upon the ring-shaped pieces of plastic and transported away from the intersecting conveyor, and a press beyond said intersecting conveyor for successively squeezing the plates with the ring-shaped plastic pieces therebetween to flatten the plastic.

7. In combination in apparatus for forming flat ring-shaped sheets of thermoplastic material on the order of a cellulosic or vinyl resin plastic, a feeding conveyor including a series of generally square, flat supporting plates and arranged to advance the plates successively, an extruder arranged to deposit rod-like ring-shaped plastic pieces upon said plates in succession, a conveyor travelling toward the plastic carrying plates and intersecting said feeding conveyor to pass the latter beyond said extruder and carrying a series of detachable flat plates which are successively deposited upon the carrying plates into superimposed relation upon the ring-shaped pieces of plastic and transported away from the intersecting conveyor, and a press beyond said intersecting conveyor for successively squeezing the plates with the ring-shaped plastic pieces therebetween to flatten the plastic, said intersecting conveyor having a return portion thereof intersectingly passing by the feeding conveyor away from the carrying plates and at a substantial distance beyond the pressing means and arranged to strip the superimposed plates from the pressed plastic sheets.

8. The method of forming flat, thin plastic sheets, which comprises successively depositing separate pieces of thermoplastic material upon a flat surfaced conveyor, moving the conveyor to progressively advance said deposited pieces of material, successively depositing in superimposed pressing relation on each piece of material a flat pressing plate, pressing the plates successively against the respective pieces of material upon which they are superimposed to flatten the pieces of material between the plates and the supporting flat surface of the conveyor, releasing the pressure from the pressing plates as soon as the thermoplastic material has been flattened, moving the pressing plates successively through a cooling zone until the flattened plastic material has set to sheet form, and stripping the pressing plates from the set plastic sheets.

GEORGE ALBERT LYON.

REFERENCES CITED

The following references are of record in the file of this patent:

UNITED STATES PATENTS

| Number | Name | Date |
| --- | --- | --- |
| 683,039 | Hagen | Sept. 24, 1901 |
| 836,169 | Wyllie | Nov. 20, 1906 |
| 1,674,387 | Campbell | June 19, 1928 |
| 1,809,137 | Miller | June 9, 1937 |
| 1,958,422 | Dinzl | May 15, 1934 |
| 2,027,165 | Grubman | Jan. 7, 1936 |
| 2,200,262 | Daley et al. | May 14, 1940 |
| 2,276,691 | Gibb | Mar. 17, 1942 |